(12) United States Patent
Linck et al.

(10) Patent No.: US 8,567,115 B2
(45) Date of Patent: Oct. 29, 2013

(54) HEATED ROLLER FOR CONTROL OF SOIL-BORNE PESTS SUCH AS NEMATODES, PATHOGENS, FUNGUS, AND WEEDS

(75) Inventors: Martin Brendan Linck, Mount Prospect, IL (US); Neil Patrick Leslie, Park Ridge, IL (US)

(73) Assignee: Gas Technology Institute, Des Plaines, IL (US)

( * ) Notice: Subject to any disclaimer, the term of this patent is extended or adjusted under 35 U.S.C. 154(b) by 450 days.

(21) Appl. No.: 13/032,704

(22) Filed: Feb. 23, 2011

(65) Prior Publication Data

US 2012/0210643 A1    Aug. 23, 2012

(51) Int. Cl.
*A01G 1/00*    (2006.01)
(52) U.S. Cl.
USPC ........ 47/1.01 F; 47/1.44; 111/118; 126/271.1
(58) Field of Classification Search
USPC ......... 47/1.01 F, 1.01 R, 1.42, 1.44; 111/118, 111/127; 126/271.1–271.3
See application file for complete search history.

(56) References Cited

U.S. PATENT DOCUMENTS

| | | | | | |
|---|---|---|---|---|---|
| 599,872 | A | * | 3/1898 | Slaughter et al. | 126/271.2 A |
| 611,712 | A | * | 10/1898 | Sindelar | 126/271.2 A |
| 1,408,471 | A | * | 3/1922 | Ricks | 126/271.1 |
| 1,632,969 | A | * | 6/1927 | Horner et al. | 404/90 |
| 1,826,232 | A | * | 10/1931 | Young | 126/271.3 |
| 2,174,842 | A | * | 10/1939 | Roman | 37/227 |
| 3,805,766 | A | * | 4/1974 | Hammon | 126/271.2 R |
| 5,178,078 | A | * | 1/1993 | Pendergrass | 111/128 |
| 5,441,038 | A | * | 8/1995 | Ohmann | 126/271.1 |
| 6,183,532 | B1 | | 2/2001 | Celli | |
| 6,319,463 | B1 | | 11/2001 | Celli | |
| 2005/0262761 | A1 | * | 12/2005 | Carroll et al. | 47/1.44 |

* cited by examiner

*Primary Examiner* — Kristen C Hayes
(74) *Attorney, Agent, or Firm* — Pauley Petersen & Erickson

(57) ABSTRACT

An apparatus for controlling or eradicating nematodes or other soil-borne pests having a heated metal roller having surface-mounted blades to heat the soil to a desired temperature and depth sufficient to effect control of the relevant species in the soil under the roller. The roller is heated with one or more burners firing across the surface of the roller. The apparatus further includes a heat exchanger through which the combustion products generated by the burner or burners are exhausted and in which the combustion air is preheated. In accordance with one embodiment, the heat exchanger condenses water vapor in the combustion products which water vapor, together with any water that evaporates from the soil during heating, may be captured and returned to the soil.

26 Claims, 3 Drawing Sheets

HEATED ROLLER FOR CONTROL OF SOIL-BORNE PESTS SUCH AS NEMATODES, PATHOGENS, FUNGUS, AND WEEDS

BACKGROUND OF THE INVENTION

1. Field of the Invention

This invention relates to an apparatus for controlling or eradicating nematodes and other soil-borne pests such as pathogens, fungus, and weeds, living in agricultural soil. In one aspect, this invention relates to an apparatus for in situ heating of soil infested with nematodes, pathogens, fungus, weeds, and other soil-borne pests. In one aspect, this invention relates to an apparatus for controlling or eradicating nematodes and other soil-borne pests such as pathogens, fungus, and weeds, living in agricultural soil using steam. In another aspect, this invention relates to a mobile apparatus for controlling or eradicating nematodes and other soil-borne pests such as pathogens, fungus, and weeds, living in agricultural soil.

2. Description of Related Art

Nematodes and other soil-borne pests, such as pathogens, fungus, and weeds, living in agricultural soil interfere with commercial cultivation of strawberries, tomatoes, and other crops. Traditionally, these pests have been controlled using chemical poisons, for example, methyl bromide, which are undesirable from an environmental perspective. Methyl bromide is a particularly powerful ozone-depleting agent as result of which its use is being phased out. While other chemical means of pest control have been documented, it is known that heat may be used to control the nematodes and other pests. In particular, if the soil is heated to a temperature of about 180° F. and held there for approximately one hour, the nematodes and other pests are generally eradicated. It is not desirable to heat the soil to higher temperatures due to the adverse affect that such higher temperatures would have on the agricultural productivity of the soil.

A variety of devices designed to heat soil and eradicate pest species are known. These include buried pipes designed to deliver hot air or steam to the soil, rakes with attached blankets that can be dragged through the soil, injecting steam to the desired depth, vehicles that inject steam into the soil, and devices that lift the soil out of the field, heat-treat the soil in mixed beds or heated augers, and then deposit the soil back in the field. However, all of the presently available technologies suffer from drawbacks that have made them unattractive as a cost-effective means of soil treatment in the United States. Technologies involving steam injection generally suffer from relatively low thermal efficiency. The installation of fixed pipes to deliver steam or heated air is expensive and inconvenient, and such a system of pipes may require considerable maintenance. Vehicles that inject steam into the soil, or systems that lift and heat the soil, have been expensive to develop and operate and may operate at low thermal efficiencies.

SUMMARY OF THE INVENTION

Accordingly, it is one object of this invention to provide a method and system for control or eradication of nematodes and other soil-borne pests that addresses the drawbacks of presently available technologies.

The apparatus of this invention for controlling or eradicating nematodes or other soil-borne pests employs a main heated metal roller featuring surface-mounted blades to heat the soil to a desired temperature and depth sufficient to effect control of the relevant species in the soil under the roller. The roller is heated with one or more burners firing across the surface of the roller. The hot combustion gases generated by the burners are exhausted from the apparatus only after passing through a condensing heat exchanger which preheats the combustion air provided to the burner or burners. In this manner, a very high thermal efficiency may be achieved and water vapor contained in the hot combustion gases, as well as any water that evaporates from the soil during heating, may be captured and returned to the soil. Because agricultural cultivation of crops requiring soil treatment is often carried out in regions where water is a scarce resource, the recovered water is an important factor in the application of this invention. Because the roller can be traversed in a continuous manner across the soil, large fields may be treated with greater ease and lower operating costs than other devices.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
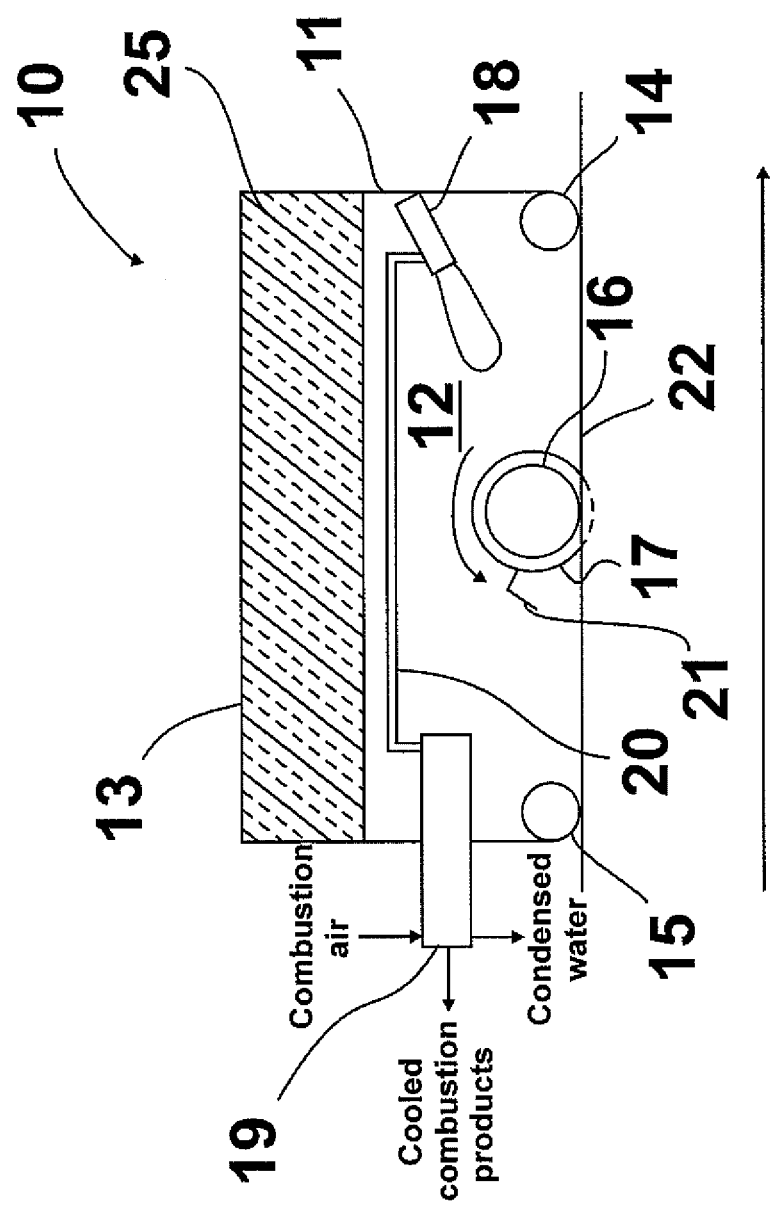
FIG. 1 is a schematic diagram of an apparatus for control or eradication of nematodes and other soil-borne pests in accordance with one embodiment of this invention.
Figure 3:
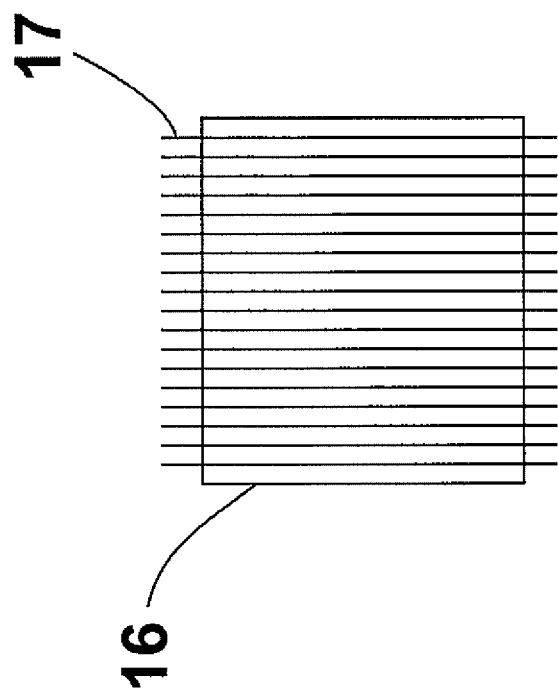
FIG. 3 is a schematic diagram of a front view of a main roller of the apparatus in accordance with one embodiment of this invention.

The apparatus of this invention provides in-situ soil heating to control or eradicate nematodes and other soil-borne pests that may be present in the soil. FIG. 1 shows a schematic side view of an apparatus 10 in accordance with one embodiment of this invention. The apparatus comprises a housing, made of metal or some other material suited to the forces and temperatures likely to be encountered during operation of the apparatus, having at least one side wall 11 enclosing a space 12 and a top wall 13 adjacent the at least one side wall. Three rollers are mounted in the bottom of the housing—a first roller 14 connected with a forward portion of the housing, a second roller 15 connected with a rearward portion of the housing, and a main or intermediate roller 16 having a larger diameter than the first and second rollers. The first and second rollers, together with the at least one sidewall and top wall provide a substantially air-tight seal around soil 22 undergoing treatment. The intermediate roller 16 is provided with a plurality of spaced apart circumferential disk blades 17 for penetrating the soil during operation of the apparatus. FIG. 3 is a frontal view of an intermediate roller 16 having a plurality of circumferential disk blades 17 in accordance with one embodiment of this invention. Because soil is an excellent insulator, a burner directed at the surface of the soil is not able to heat the soil evenly to any useful depth. However, by heating the blades, which are pressed down into the soil during operation of the apparatus, the heat can be carried into the soil with great efficiency, and a substantially more uniform temperature distribution may be created in those regions of the soil accessed by the blades. Any materials having suitable strength and thermal properties to enable performance of this function may be used to make the disk blades. In accordance with one preferred embodiment of this invention, the disk blades are made of metal. Based on the relative thermal properties of the soil and the metal, such as carbon steel, used to make the disk blades, a blade thickness of about one quarter to about 3/8 inches and a blade spacing of about 1 to 2 inches is sufficient to uniformly heat the soil to a depth in the range of about 6 to 10 inches. However, it is to be understood that the precise arrangement and dimensions of the blades may vary based on soil characteristics and the treatment needed to eradicate the pests of interest.

Heat for the process is provided by one or more burners 18 (collectively referred to as "the combustor") disposed within the forward portion of the housing and adapted to provide heat to the intermediate roller so as to fire across the surface of the intermediate roller. The combustor may be fired with a liquid fuel pumped from an unpressurized fuel tank or with a compressed gaseous fuel obtained from a pressurized tank. If a compressed gaseous fuel is used, the burners may be self-aspirating, in which case no blower is needed to supply combustion air to the burners. If the burners are liquid-fueled, a blower may be needed to push combustion air into the apparatus to supply the burner. For this reason, in accordance with one preferred embodiment of this invention, the combustor is fired with compressed natural gas or propane.

During operation of the apparatus of this invention, hot combustion products produced by the combustor pass over the top of the intermediate roller, transferring a substantial amount of heat to the components comprising the intermediate roller. Because the combustion products pass over and between the disk blades on the roller, the blades themselves provide sufficient surface area to transfer heat efficiently from the stream of combustion product gases to the components of the intermediate roller. In order that the combustion products may be exhausted from the housing, the apparatus comprises a heat exchanger 19 mounted in the rearward portion of the apparatus. In addition to exhausting the combustion products, the heat exchanger includes a combustion air inlet through which combustion air is introduced into the heat exchanger in which heat is transferred from the hot combustion products to the cooler combustion air, producing preheated combustion air and cooled combustion products, a cooled combustion products outlet through which the cooled combustion products are exhausted from the heat exchanger, and a preheated combustion air outlet through which the preheated combustion air is expelled. To provide communication of the preheated combustion air to the combustor, the apparatus of this invention further comprises a preheated combustion air conduit 20 in fluid communication with the preheated combustion air outlet and the combustor. In accordance with one preferred embodiment of this invention, heat exchanger 19 is a condensing heat exchanger wherein water vapor present in the stream of combustion products is condensed as liquid water by the cooling effect of the incoming combustion air, which liquid water is removed from the heat exchanger through a condensed water outlet. Thus, the exhaust stream contains only nitrogen, combustion products, i.e. $CO_2$, and any trace water vapor that remains in thermal equilibrium with the coolest section of the heat exchanger. Because the soil under the intermediate roller may contain a considerable amount of moisture, and a significant portion of this moisture may evaporate as the soil is heated, it is desirable to recondense this water vapor, both to improve the thermal efficiency of the system and to reduce the need for irrigation of the field after processing. Any condensed water may then be returned to the soil.

In accordance with one embodiment of this invention, a soil return claw 21 extending between the blades of the intermediate roller removes any soil that may be caught between the blades and prevents the soil from being carried over the top of the intermediate roller as the intermediate roller rotates.

Figure 2:
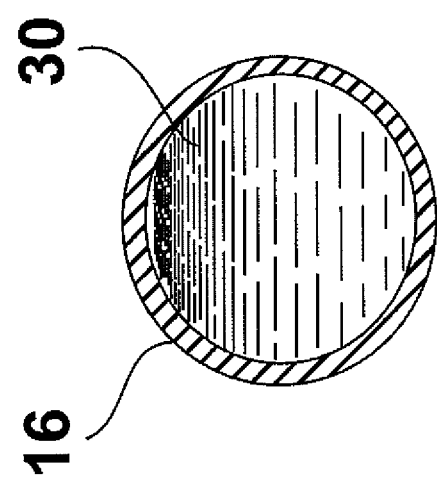
FIG. 2 is a schematic diagram of a lateral view of a main roller of the apparatus in accordance with one embodiment of this invention.

To provide sufficient heat on a continuing basis to the soil, the intermediate roller should have a high internal thermal conductivity so that heat may be efficiently carried from the top of the roller where the combustion products from the burner interact with the components of the intermediate roller to the portion of the blades under the intermediate roller that are in intimate contact with the soil. In accordance with one particularly preferred embodiment, the entire intermediate roller, including the disk blades mounted on the surface are substantially isothermal. In order to save weight and costs, the interior of the intermediate roller may be filled with a liquid 30 as shown in FIG. 2 instead of consisting of solid metal. This liquid must have a high thermal conductivity but must also have a vapor pressure low enough to ensure that no significant pressure is exerted on the inside of the intermediate roller when it is at operating temperature. To operate effectively, the intermediate roller should have a temperature in a range of about 180° F. to about 220° F. One suitable liquid for use in the intermediate roller in accordance with one embodiment of this invention is water mixed with salts to form brine. In accordance with one embodiment of this invention, the liquid is a glycol, such as propylene glycol or ethylene glycol. In accordance with one embodiment of this invention, the liquid is a mineral oil. The exact composition of the liquid may be selected based on cost considerations and the desired operating conditions.

Thermal efficiency of the apparatus of this invention may be further increased by a thick layer of insulation 25 disposed within the interior of the housing surrounding the space in which the intermediate roller is located. This insulation ensures that the heat from the burner is transferred to the intermediate roller or to the incoming combustion air and is not lost to the surrounding environment. Because soil is an excellent insulator, heat transferred into the soil by the apparatus will remain behind as the apparatus moves forward and will continue to act on the pest population in the soil for a considerable length of time after the apparatus has moved on.

Control of the apparatus depends on a variety of factors including soil characteristics, the rate of desired forward motion, and the desired soil temperature during processing. The burner firing rate may be increased to allow the apparatus to move more rapidly over the field and still heat the soil effectively; however, it cannot be increased to a point where the blades enter the soil at a temperature that would sterilize the soil. An optimal firing rate therefore exists at which the apparatus may be traversed with the highest possible speed consistent with the constraint on the maximum blade temperature that can be tolerated by the soil. This constraint will vary depending on soil type and the desired maximum temperature.

Figure 4:
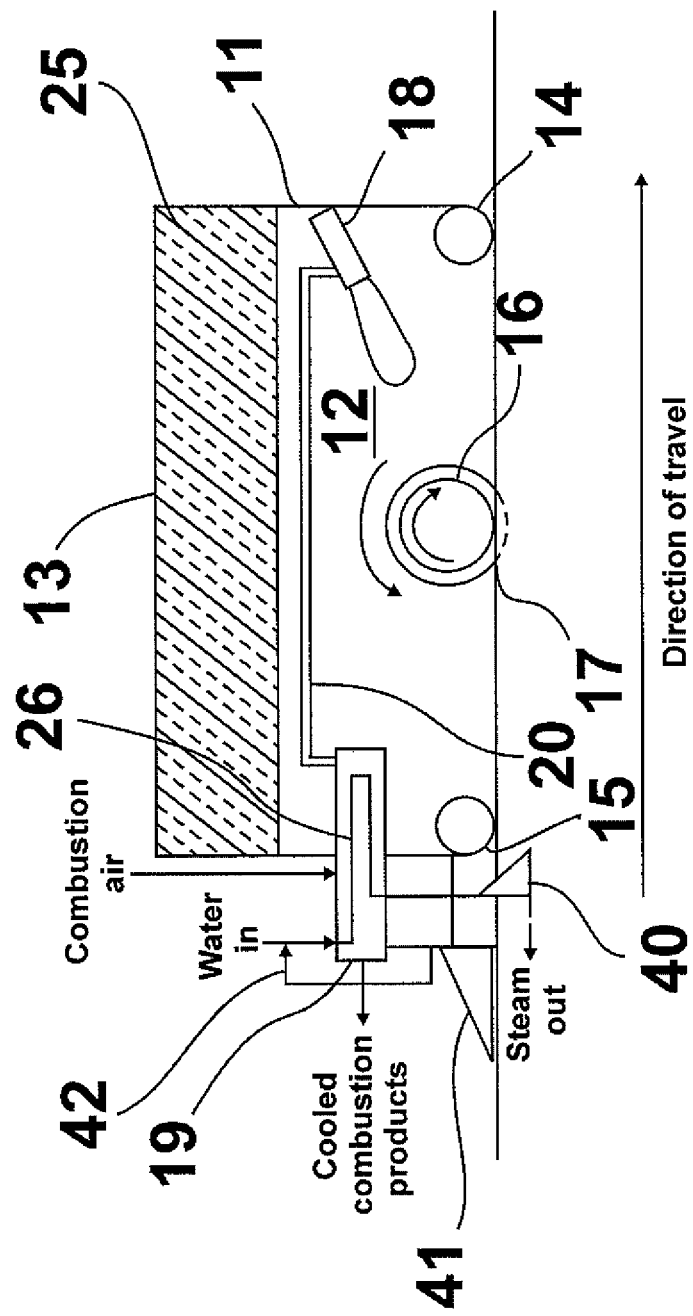
FIG. 4 is a schematic diagram of an apparatus for control or eradication of nematodes and other soil-borne pests in accordance with one embodiment of this invention.

Another embodiment of the apparatus of this invention is shown in FIG. 4. In this embodiment, heat exchanger 19 comprises a separate heat exchanger section 26 having a water inlet for introduction of water therein. The heat contained in the exhaust stream from the combustor section is then used to boil the water and produce steam, in addition to preheating the combustion air, which is exhausted from the separate heat exchanger section through a steam outlet. Because some water will invariably be condensed from the combustion products, this water may be captured and added by way of conduit 42 to the stream of water introduced into the separate heat exchanger section for producing the same.

In accordance with one embodiment of this invention, the steam produced in the separate heat exchanger section is provided to the bottom of the apparatus where it emerges from the trailing edge of a steam injection plough 40. Hot steam is a highly efficient means by which to transfer heat to packed solids, such as soil, and this feature may assist in controlling the temperature profile under and behind the apparatus in certain soils where the heated intermediate roller is not, by itself, capable of producing the desired effect.

In accordance with one embodiment of this invention, the apparatus comprises a scoop 41 attached to the back of the apparatus which is used to pile up the soil as the apparatus passes over the ground, forming a mound over the heated section of the soil. The heated soil may then stay hotter longer than it would be if no mound were formed, and the mound itself may be a desirable feature when crops are planted in the field since plants are often placed in mounds like this for better drainage. The scoop may be used to form a single mound or may be contoured to produce multiple mounds in the track of the apparatus.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus for in-situ soil heating comprising:
   a housing having at least one side wall enclosing a space and a top wall adjacent said at least one side wall;
   a first roller connected with a forward portion of said housing and a second roller connected with a rearward portion of said housing, said rollers together with said at least one side wall providing a substantially air-tight seal around soil undergoing heating;
   an intermediate roller larger in diameter than said first and second rollers, said intermediate roller comprising a plurality of spaced apart circumferential disk blades; and
   at least one burner disposed within said forward portion of said housing adapted to provide heat to said intermediate roller.

2. The apparatus of claim 1 further comprising a condensing heat exchanger adapted to receive combustion products produced by said at least one burner and having a combustion air inlet, a condensed water outlet, a cooled combustion products outlet, and a preheated combustion air outlet.

3. The apparatus of claim 2 further comprising a preheated combustion air conduit providing fluid communication between said preheated combustion air outlet and said at least one burner.

4. The apparatus of claim 1 further comprising at least one soil return claw disposed within said housing and adapted to remove residual soil from between said circumferential disk blades.

5. The apparatus of claim 1, wherein said intermediate roller is a hollow cylinder filled with a thermally conductive fluid.

6. The apparatus of claim 1 further comprising steam generating means for generating steam.

7. The apparatus of claim 6 further comprising steam injection means for injecting steam into said soil.

8. The apparatus of claim 7, wherein said steam injection means comprises a steam injection plough adapted to receive steam from said steam generating means.

9. The apparatus of claim 6, wherein said steam generating means comprises a condensing heat exchanger having a water inlet, a combustion air inlet, a combustion products inlet adapted to receive combustion products generated by said at least one burner, and a steam outlet.

10. The apparatus of claim 9, wherein said condensing heat exchanger has a condensed water outlet.

11. The apparatus of claim 10 further comprising condensed water recycling means for recycling condensed water from said condensed water outlet to said water inlet.

12. The apparatus of claim 1, wherein said space is insulated by insulation disposed inside said housing.

13. The apparatus of claim 1 further comprising mounding means for mounding heated soil.

14. An apparatus for in situ heating of soil comprising:
   a housing having a forward portion and a rearward portion enclosing an area of soil to be heated;
   a forward roller connected with said forward portion of said housing, a rearward roller connected with said rearward portion of said housing, said rollers and said housing together forming a substantially air-tight cavity over said soil;
   an intermediate roller having a larger diameter than said forward and rearward rollers connected with said housing intermediate said forward and rearward rollers;
   a plurality of spaced apart circumferential fins connected with said intermediate roller;
   at least one burner disposed within said cavity proximate said forward portion of said housing and adapted to direct combustion products generated by said burner onto a circumferential surface of said intermediate roller; and
   exhaust means for exhausting said combustion products from said cavity.

15. The apparatus of claim 14 further comprising a condensing heat exchanger having a combustion products inlet in fluid communication with said cavity, a condensed water outlet, and a cooled combustion products outlet.

16. The apparatus of claim 15, wherein said condensing heat exchanger has a combustion air inlet and a preheated combustion air outlet.

17. The apparatus of claim 16 further comprising a preheated combustion air conduit disposed within said cavity and providing fluid communication between said preheated combustion air outlet and said at least one burner.

18. The apparatus of claim 14 further comprising at least one soil return claw disposed within said cavity and adapted to remove residual soil from between said spaced apart circumferential fins.

19. The apparatus of claim 14, wherein said intermediate roller is a hollow cylinder filled with a thermally conductive fluid.

20. The apparatus of claim 14 further comprising steam generating means for generating steam.

21. The apparatus of claim 20 further comprising steam injection means for injecting steam into said soil.

22. The apparatus of claim 21, wherein said steam injection means comprises a steam injection plough adapted to receive steam from said steam generating means.

23. The apparatus of claim 20, wherein said steam generating means comprises a condensing heat exchanger having a water inlet, a combustion air inlet, a combustion products inlet adapted to receive combustion products generated by said at least one burner, and a steam outlet.

24. The apparatus of claim 23 further comprising condensed water recycling means for recycling condensed water produced by said condensing heat exchanger to said water inlet.

25. The apparatus of claim 14, wherein said cavity is insulated by insulation disposed inside said housing.

26. The apparatus of claim 14 further comprising mounding means for mounding heated soil.

\* \* \* \* \*